United States Patent [19]
Saito

[11] Patent Number: 5,152,444
[45] Date of Patent: Oct. 6, 1992

[54] TAPE GUIDING ELEMENT SUBJECTED TO ULTRASONIC OSCILLATIONS FOR REDUCING FRICTIONAL RESISTANCE TO MOVEMENT OF GUIDED TAPE

[75] Inventor: Etsuro Saito, Kanagawa, Japan

[73] Assignee: Sony Corporation, Tokyo, Japan

[21] Appl. No.: 489,043

[22] Filed: Mar. 5, 1990

[30] Foreign Application Priority Data

Mar. 6, 1989 [JP] Japan .................................. 1-53287

[51] Int. Cl.$^5$ ............................................. B65H 27/00
[52] U.S. Cl. .................................... 226/196; 242/76; 226/194
[58] Field of Search ............. 242/76, 157 R; 226/194, 226/196, 197, 200

[56] References Cited

U.S. PATENT DOCUMENTS

| | | | |
|---|---|---|---|
| 3,432,082 | 3/1969 | Beville et al. | 226/194 X |
| 4,573,619 | 3/1986 | Grant | 226/196 X |
| 4,582,235 | 4/1986 | Schulz | 226/197 |
| 4,875,610 | 10/1989 | Kitamoto et al. | 226/10 |

FOREIGN PATENT DOCUMENTS

| | | |
|---|---|---|
| 100284 | 2/1984 | European Pat. Off. . |
| 3336921 | 5/1985 | Fed. Rep. of Germany . |
| 664213 | 5/1979 | U.S.S.R. . |
| 698051 | 11/1979 | U.S.S.R. . |
| 900311 | 1/1982 | U.S.S.R. . |

*Primary Examiner*—Daniel P. Stodola
*Assistant Examiner*—P. Bowen
*Attorney, Agent, or Firm*—Alvin Sinderbrand; William S. Frommer

[57] ABSTRACT

In a tape guiding device for a video tape recorder or the like, an elongated guide element having a peripheral surface slidably engageable by the tape for guiding the latter is fixedly connected, at spaced apart locations along the guide element, with a support or base structure, and an ultrasonic oscillation generating transducer acts, at least at one end, against the guide element for generating a standing wave oscillation in the guide element having nodes at the spaced apart locations where the guide element is fixed to the support or base structure.

27 Claims, 6 Drawing Sheets

TAPE GUIDING ELEMENT SUBJECTED TO ULTRASONIC OSCILLATIONS FOR REDUCING FRICTIONAL RESISTANCE TO MOVEMENT OF GUIDED TAPE

BACKGROUND OF THE INVENTION

1. Field of the Invention

This invention relates generally to a tape guiding device, and more particularly is directed to a tape guiding device in which a guide element is subjected to ultrasonic oscillations for reducing frictional resistance to movement of a guided tape, for example, as in a video tape recorder (VTR).

2. Description of the Prior Art

Figure 1:
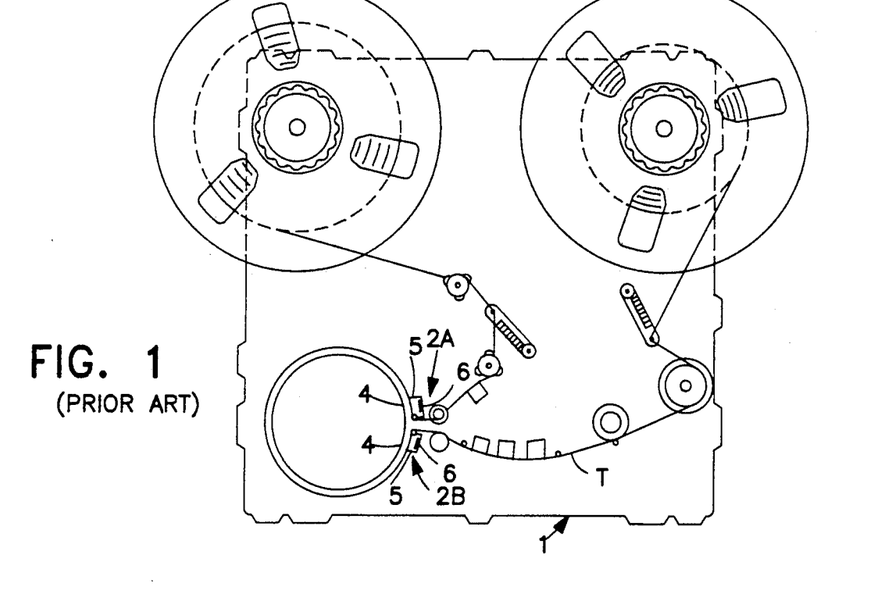
FIG. 1 is a plan view of a VTR of the open reel type provided with tape guiding devices of the prior art.

It has been proposed by persons having an obligation to assign to the assignee of the present application, for example, as disclosed in Japanese Patent Application No. 63-18524, to provide a video tape recorder (VTR) with ultrasonically oscillated tape guide elements for the purpose of reducing the frictional resistance to movement of the tape resulting from the sliding engagement of the tape with the guide elements. For example, as shown in FIG. 1, it has been proposed to provide a VTR 1 of the open reel type with tape guiding devices 2A and 2B for guiding a magnetic recording tape T to and from, respectively, the peripheral surface of a rotary head drum 3. As shown on FIGS. 2 and 3, each of the tape guiding devices 2A and 2B includes a cylindrical guide element 4 which extends upwardly from, and is secured at its lower end to a free end portion 5a of a respective guide support member 5 so that the tape T may slidably engage and be guided by the peripheral surface of the upstanding cylindrical guide element 4. The guide support member or holder 5 is shown to be generally elongated and formed intermediate its ends, with a recess 5b opening laterally at one side of the support member and accommodating an ultrasonic oscillation generating transducer 6, which may be comprised of a stack or lamination of piezo-electric plates. The stack or lamination of piezo-electric plates is shown to be arranged generally parallel to the longitudinal axis of the guide support member 5, and the end plates of the transducer 6 engage against the adjacent ends of the recess 5b at one side of the longitudinal axis of the guide support member 5. Thus, when the stack of piezo-electric plates making up the transducer 6 expands and contracts, as indicated by the arrows 7 on FIGS. 2 and 3, the guide support member 5 is flexed laterally causing its free end portion 5a to oscillate laterally as indicated by the arrow 8 on FIG. 3, for example, between the positions shown in full lines and in broken lines at 5a and 5'a which show an exaggerated oscillation for the purposes of illustration. Of course, the lateral oscillation of the free end portion of the guide support member 5 is transmitted more or less to the upstanding guide element 4 mounted thereon, and it was anticipated that the resulting oscillation of the guide element 4 would be effective to substantially reduce the friction coefficient or so-called "pseudo-adhesion force" of the magnetic tape T in respect to the guide element 4, and thereby achieve improved stability of the movement of the tape in the VTR 1.

However, it has been found that, in the known arrangement, as described above with reference to FIGS. 1-3, and in which the ultrasonic energy is imparted to the tape guiding element 4 through the support member 5 for the latter, the oscillation energy generated by the ultrasonic piezo-electric transducer 6 is inadequately transferred to the guide element 4 so that the friction coefficient of the tape T in respect to the guide element 4 cannot be decreased sufficiently for achieving the desired stability of the tape movement. Further, the oscillation of the guide element 4 as a result of the action of the transducer 6 on the support member 5 is not a standing wave so that it is easily dispersed, particularly when the tape T engaging the peripheral surface of the guide element 4 is under substantial tension, as is the case when the tape guiding devices 2A and 2B are arranged with their guide elements 4 inclined from the vertical in leading the tape to and from the surface of the rotary head drum 3 in the case of a helical scan system. It has also been found that, in the case of the known arrangement shown on FIGS. 1-3, it is not possible to obtain oscillations of the guide element 4 at adequately high frequencies, for example, of about 150 KHz, and small amplitudes, for example, about 1 micron, as such high frequencies and small amplitudes cannot be well transmitted through the support member 5 to the guide element 4 supported thereon. Moreover, the described high frequencies and small amplitudes have been found to be desirable in that they effectively reduce the frictional resistance to movement of the tape relative to the guiding element or post while minimizing the extent to which the vibration is transmitted along the tape from the location where the latter is guided by the ultrasonically oscillated guide element or post.

OBJECTS AND SUMMARY OF THE INVENTION

Accordingly, it is an object of the present invention to provide a tape guiding device having a guiding element which is ultrasonically oscillated in a manner to avoid the above described problems associated with the prior art.

More specifically, it is an object of this invention to provide a tape guiding device having a guide element which is ultrasonically oscillated so as to provide a standing wave oscillation thereon of relatively high frequency and small amplitude by which the frictional resistance to movement of a tape while being guided by the peripheral surface of the guide element is very substantially reduced while enhancing the stability of the movement of the tape.

Another object is to provide a tape guiding device, as aforesaid, in which the angular disposition of the tape guiding element can be effectively adjusted.

Still another object of the invention is to provide a tape guiding device, as aforesaid, which can be relatively easily and inexpensively produced and assembled so as to make practical its use in VTRs or other similar apparatus in which minimizing of the frictional resistance to tape movement, and the consequent stabilizing of movements of the guided tape are highly desirable.

In accordance with a characterizing aspect of this invention, in a tape guiding device for a video tape recorder or the like, an elongated guide element having a peripheral surface slidably engageable by the tape for guiding the latter in its movement is fixedly connected, at spaced apart locations along the guide element, with a base structure, and an ultrasonic oscillation generating transducer acts, at least at one end, against the guide element for generating a standing wave oscillation in the guide element which has nodes at the spaced apart locations where the guide element is fixed to the support or base structure.

The foregoing aspect of the invention may be embodied in tape guiding devices in which the ultrasonic oscillation generating transducer acts on the guide element in a direction perpendicular to the direction in which the guide element is elongated, with such action of the ultrasonic oscillation generating transducer being applied to the guide element either intermediate the locations where the guide element is fixed to the support or base structure, or at one of the ends of the guide element which project beyond the locations where the guide element is fixed to the support or base structure.

Alternatively, the previously described characterizing aspect of the present invention may be desirably embodied in a tape guiding device having its guide element formed with a recess extending parallel to the direction in which the guide element is elongated and opening laterally at a side of the guide element facing away from the peripheral surface thereof engaged by the tape, with the ultrasonic oscillation generating transducer being accommodated in such recess and acting, at its opposite ends, against respective ends of the recess for directly generating the standing wave oscillation in the guide element.

The above, and other objects, features and advantages of this invention, will be apparent in the following detailed description of illustrative embodiments of the invention which is to be read in connection with the accompanying drawings forming a part hereof and in which corresponding parts are similarly identified in the several views.

BRIEF DESCRIPTION OF THE DRAWINGS

FIGS. 15 and 16 are schematic perspective and sectional views similar to those of FIGS. 5 and 6, but illustrating a tape guiding device according to still another embodiment of the invention in which ultrasonic oscillations are transmitted to the elongated tape guide element at one end of the latter, rather than at the middle thereof, as in the embodiments of FIGS. 5-14;

DESCRIPTION OF THE PREFERRED EMBODIMENTS

Figure 4:
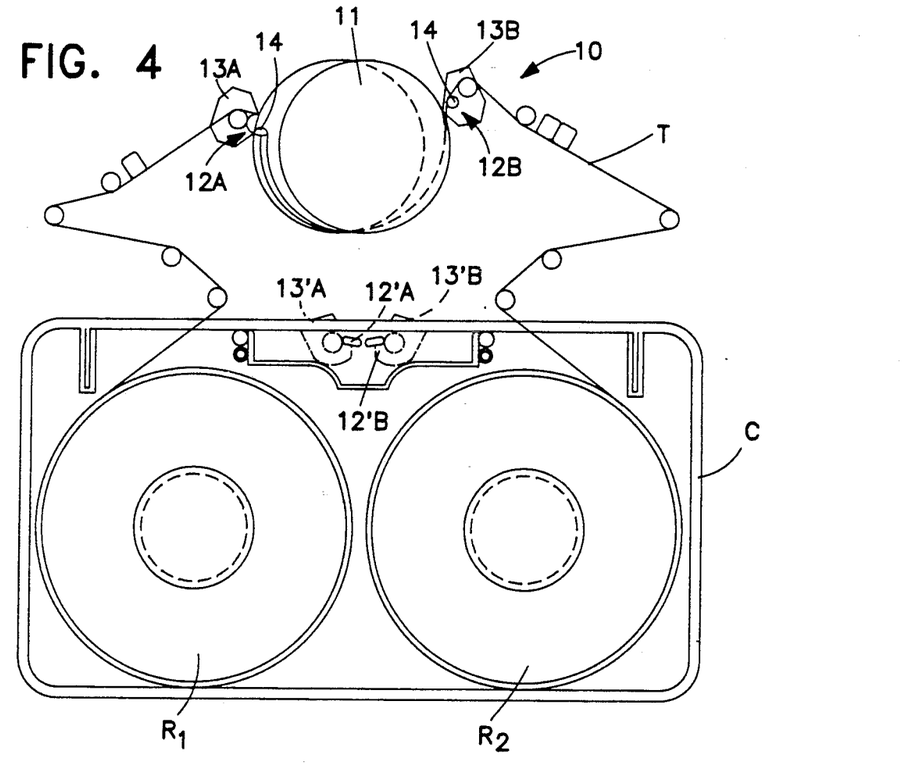
FIG. 4 is a schematic plan view illustrating a video cassette recorder (VCR) to which tape guiding devices according to an embodiment of the present invention are advantageously applied.

Referring now to FIG. 4 of the drawings, it will be appreciated that the present invention is there shown applied to a video cassette recorder (VCR) 10, that is, a VTR intended for use with a cassette C containing supply and takeup reels $R_1$ and $R_2$ on which the tape T is wound. Such VCR 10 may conventionally employ a so called "M-loading" operation for withdrawing the tape T from within the operatively positioned cassette C and wrapping the withdrawn tape in a helical fashion about a tilted rotary head drum 11, as shown in full lines on FIG. 4.

The M-loading operation is conventionally effected, in part, by tape guiding devices 12A and 12B mounted on suitably guided slides 13A and 13B, respectively, for movement between initial positions indicated in dot-dash lines at 12'A and 12'B, where the tape guiding devices extend into the operatively positioned cassette C for engagement with the tape therein, and operative positions indicated in full lines on FIG. 4, and at which the tape guiding devices 12A and 12B guide the withdrawn tape T to and from the surface of the rotary head drum 11.

Figure 5:
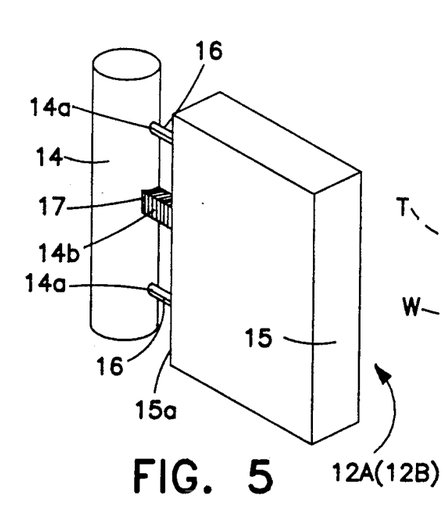
FIG. 5 is a schematic perspective view of one of the tape guiding devices according to an embodiment of the present invention.
Figure 6:
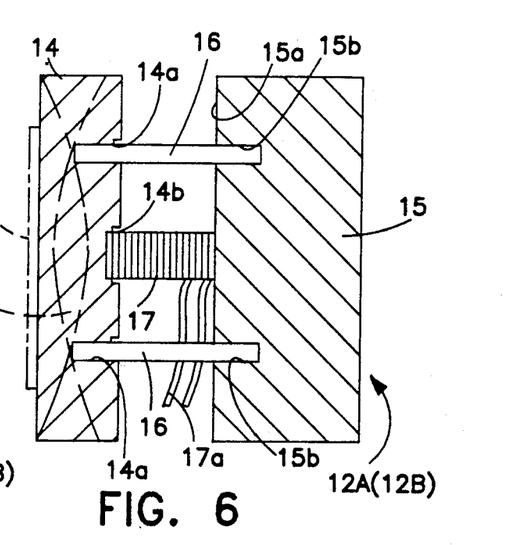
FIG. 6 is a schematic vertical sectional view of the tape guiding device of FIG. 5.

As shown on FIGS. 5 and 6, in accordance with an embodiment of this invention, each of the tape guiding devices 12A and 12B generally comprises an elongated guide element 14, a base block 15, a pair of parallel spaced apart support rods 16 by which the guide element 14 is fixedly connected with the base block 15 at spaced apart locations along the elongated guide element 14 for supporting the latter, and an ultrasonic oscillation generating transducer 17 in the form of a stack of piezo-electric plates which is arranged between the guide element 14 and the base block 15 and is operative to generate a standing wave oscillation in the guide element 14.

More specifically, in the embodiment of FIGS. 5 and 6, the guide element 14, which may be formed of metal, is shown to have a solid cylindrical configuration in which there are formed a pair of bores 14a opening radially outward, that is, extending at right angles to the longitudinal axis of the guide element 14. The bores 14a are spaced apart in the longitudinal direction of the guide element 14 so as to be situated in the opposite end portions thereof, and a shallow recess 14b is situated midway between the bores 14a to provide a seat for the adjacent end of the ultrasonic oscillation generating transducer 17. The inner portions of the bores 14a are diametrically dimensioned to tightly receive the respective end portions of the support rods 16 which are, for example, press-fitted therein, and the outer, or open end portions of the bores 14a are desirably diametrically enlarged for avoiding excessive stressing of the support rods 16 when a standing wave oscillation is generated in the guide element 14, as hereinafter further described.

The ends of the support rods 16 remote from the guide element 14 are press-fitted in similarly spaced apart bores 15b opening at a front face 15a of the base block 15 which is shown to have the configuration of a rectangular parallelepiped. Thus, the guide element 14 is mounted parallel to the face 15a of the base block 15 and spaced from the latter so as to accommodate the ultrasonic oscillation generating transducer 17 between the central recess 14b of the guide element and a central area of the face 15a. By reason of the foregoing, the axis of the stack of piezo-electric plates making up the transducer 17 extends perpendicular to the longitudinal axis of the guide element 14 midway between the spaced apart support rods 16 which define the locations at which the guide element 14 is fixedly connected to the base block 15. It will also be appreciated from FIGS. 5 and 6 that the ends of the guide element 14 project beyond such locations where the guide element is fixed to the base block 15.

In the VCR 10 of FIG. 4, the base block 15 of each of the tape guiding devices 12A and 12B may be suitably mounted in an inclined position on the respective slider 13A or 13B so that, when the tape guiding devices 12A and 12B are in their operative positions shown in full lines on FIG. 4, the tape T is slidably engageable with the peripheral surface of each guide element 14 at the side of the latter facing away from the respective base block 15, as indicated in dot-dash lines on FIG. 6, and will be guided thereby in a helical path about the tilted rotary head drum 11 while the tape is conventionally transported in its longitudinal direction between the reels $R_1$ and $R_2$.

During such longitudinal transport of the tape T, the transducer 17 of each of the tape guiding devices 12A and 12B is suitably energized through the leads 17a shown on FIG. 6 and, as a result thereof, the central portion of the respective guide element 14 is directly oscillated by the ultrasonic oscillation generating transducer in the direction perpendicular to the longitudinal axis of the guide element 14, and a standing wave oscillation indicated in dot-dash lines W on FIG. 6 is thereby generated in the guide element 14 with nodes of such standing wave oscillation appearing at the locations where the guide element 14 is fixedly connected to the respective base block 15, as by the support rods 16.

Figures 2, 3:
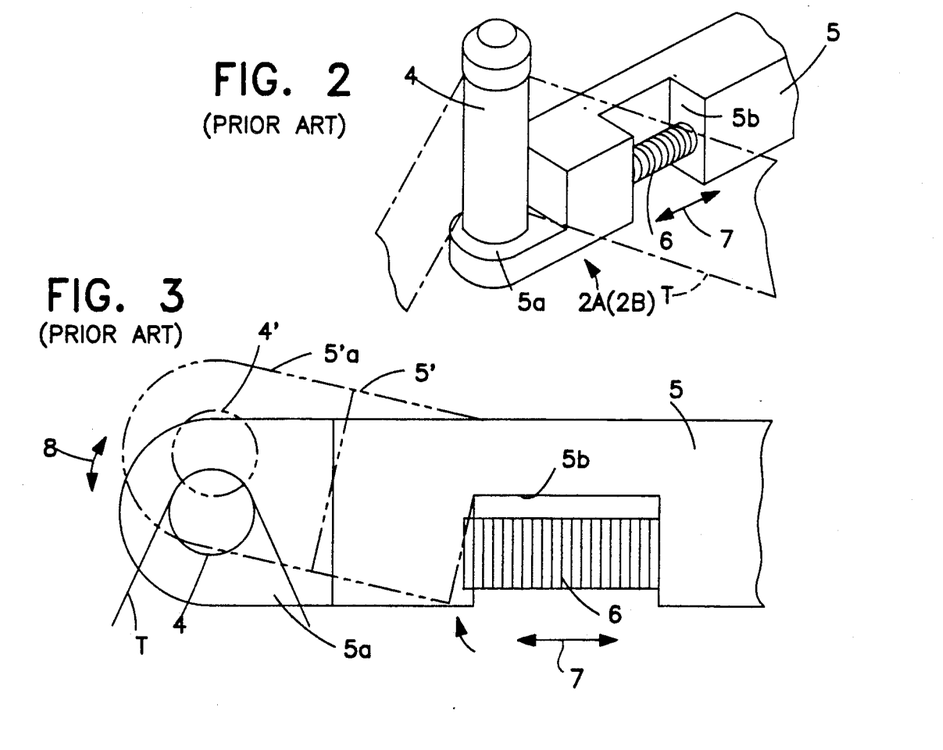
FIG. 2 is a fragmentary enlarged perspective view illustrating one of the tape guiding devices according to the prior art included in the VTR of FIG. 1.
FIG. 3 is a further enlarged detail plan view of the tape guiding device of FIG. 2, and presenting an exaggerated illustration of the oscillation thereof.

By reason of the fact that the guide element 14 is mounted so as to ensure that the action of the ultrasonic transducer 17 thereon will generate a standing wave oscillation at the resonance frequency of the element 14, both the guide element 14 and the tape T engaging its peripheral surface can be readily oscillated in the radial direction of the guide element 14, with the frequency of such oscillation by the ultrasonic transducer 17 being very substantially higher than that previously attainable with the prior art illustrated in FIGS. 2 and 3. For example, the resonance frequency of the guide element 14 may be of the order of 150 KHz with such guide element being oscillated with a small amplitude, for example, of about 1. micron at the region of maximum displacement. Further, by reason of the foregoing, the pseudo adhesion force of the magnetic tape in respect to the peripheral surface of the guide element 14 can be reduced to an extremely small value so that resistance to movement of the tape is lowered and stable tape movement can be achieved.

Since the guide element 14 is directly oscillated by the ultrasonic oscillation generating transducer 17, substantially all of the oscillation energy generated by the transducer 17 can be utilized in producing oscillation of the guide element 14, whereby energy loss is remarkably low and a desirably high operating efficiency is achieved.

Furthermore, heat generated by the ultrasonic oscillation generating transducer 17 when the oscillation frequency is increased is transmitted to the metal base block 15 directly and also from the guide element 14 through the support rods 16, and is easily discharged to the atmosphere from the several faces of the base block 15. Therefore, the temperature of the guide element 14 is not greatly increased and the magnetic tape T guided by the surface of the guide element 14 is not subjected to heat deformation even when the coefficient of friction of the tape relative to the guide element 14 is very substantially reduced in response to increasing the oscillation of the transducer 17. Moreover, since the laminated type ultrasonic oscillation generating transducer 17 is simply mounted between the guide element 14 and the base block 15, no special structure is required for the mounting of the transducer 17 and, therefore, miniaturizing of the tape guiding device 12A or 12B and reduction of its weight are facilitated.

Figure 7:
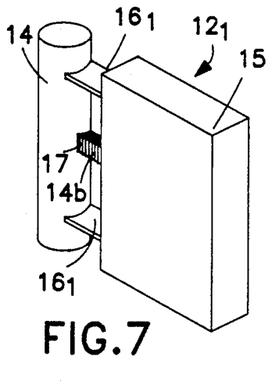
FIGS. 7-11 are perspective views similar to that of FIG. 5, but illustrating tape guiding devices according to respective different embodiments of the present invention.

Although the guide element 14 is shown on FIGS. 5 and 6 to be fixedly connected to the base block 15 by the support rods 16 at nodes of the standing wave oscillation W generated in the guide element 14, it will be apparent that many other structures can be similarly employed in place of such support rods 16. Thus, for example, as shown in FIG. 7, a tape guiding device $12_1$ which is otherwise similar to the tape guiding device 12A or 12B of FIGS. 5 and 6, has the support rods 16 of the latter replaced by relatively flat or web-like support members $16_1$. The web-like support members $16_1$ of FIG. 7 have the major axes of their cross-sections lying in planes perpendicular to the axis of the guide element 14 so that the web-like support members $16_1$ will not interfere with the generation of the standing wave oscillation in the guide element 14.

Figure 8:
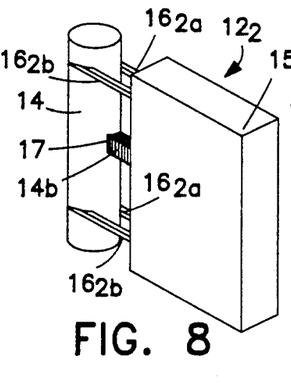

Referring now to FIG. 8, it will be seen that a tape guiding device $12_2$ which is also otherwise similar to the tape guiding devices 12A and 12B of FIGS. 5 and 6, has the support rods 16 of the latter each replaced by a pair of laterally spaced apart support struts $16_{2a}$ and $16_{2b}$ which are parallel to each other. The support struts $16_{2a}$ and $16_{2b}$ may be desirably of substantially U-shaped cross section which are arranged to open towards each other. Once again, the support struts $16_{2a}$ and $16_{2b}$ are suitably joined to the guide element 14 and to the base block 15 so as to fixedly connect the guide element to the base block at spaced apart locations corresponding to the nodes of the standing wave oscillation generated in the guide element 14 by operation of the transducer 17.

Figure 9:
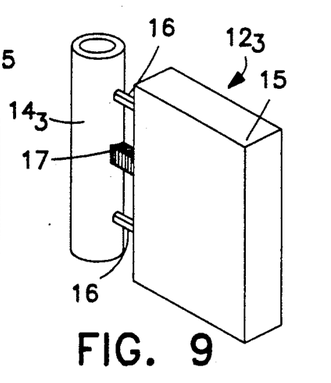

Although the tape guiding devices described above with reference to FIGS. 5 and 6, FIG. 7 and FIG. 8 have employed guide elements 14 of solid cylindrical configuration, various modifications of the form of the guide element 14 can be employed in accordance with this invention. For example, as shown in FIG. 9, in a tape guiding device $12_3$ which is otherwise similar to the previously described tape guiding devices, the guide element $14_3$ may be in the form of an elongated cylindrical tube which is suitably fixed to the base block 15 by the support rods 16 at locations along the tubular guide element $14_3$ which correspond to the nodes of the standing wave oscillation generated therein by the ultrasonic transducer 17. The tubular guide element $14_3$ has the advantage over the solid cylindrical guide element 14 of permitting a relatively higher oscillation frequency thereof for further decreasing the frictional coefficient of the magnetic tape in respect to the oscillated guide element $14_3$, and also of permitting the overall weight of the tape guiding device $12_3$ to be reduced.

Figure 10:
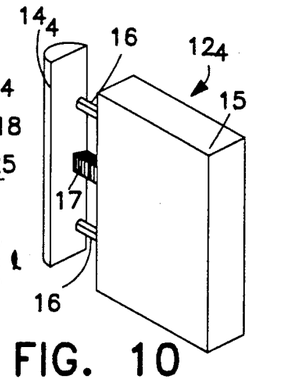

Referring now to FIG. 10, it will be seen that, in a tape guiding device $12_4$ according to still another embodiment of this invention which is otherwise similar to the previously described embodiments, the elongated solid guide element $14_4$ is formed with a half-cylindrical configuration to provide a curving surface engageable by the guided tape, as in the case of a full-cylindrical guide element, but which permits a relative reduction in the size and weight of the tape guiding device $12_4$.

In each of the previously described embodiments of the invention, the guide element 14, $14_3$ or $14_4$ and the respective base block 15 have been assumed to be separately formed and then fixed or connected to each other by way of the support rods, webs or struts 16, $16_1$, or $16_{2a}$ and $16_{2b}$. However, it is to be understood that, in tape guiding devices embodying the present invention, the guide element and the base block or support therefor may be formed integrally or as parts of a one-piece structure.

Figure 11:
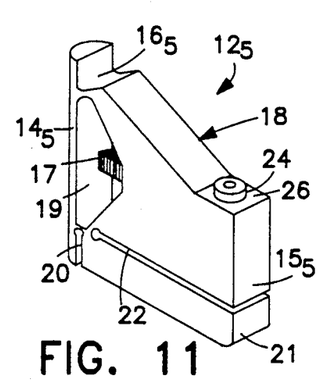
Figure 12:
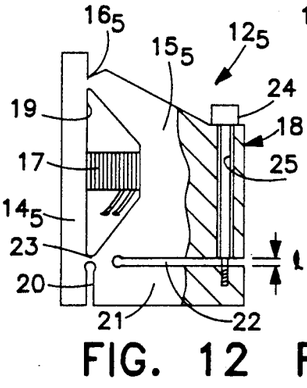
FIG. 12 is a side elevational view of the tape guiding device of FIG. 11 which is shown partly broken away and in section so as to illustrate the manner in which the guide element thereof may be angularly adjusted.

For example, as shown in FIGS. 11 and 12, a tape guiding device $12_5$ in accordance with still another embodiment of this invention is generally similar to that shown in FIG. 10, in that it embodies a half-cylindrical guide element $14_5$, but such guide element $14_5$ is formed integrally with a base block $15_5$. In other words, in the tape guiding device $12_5$, the guide element $14_5$ and the base block $15_5$ are integral parts of a one-piece body 18 molded of metal so as to have an opening or cavity 19 for accommodating the ultrasonic transducer 17, and further to define relatively narrow connecting portions or necks $16_5$ connecting the guide element $14_5$ to the base member $15_5$ at the spaced apart locations corresponding to the nodes of the standing wave oscillation generated in the guide element $14_5$ in response to operation of the ultrasonic transducer 17.

Further, the one-piece body 18 is shown to be formed with a slot 20 extending from below the lower connecting portion $16_5$ and opening at the bottom surface of the body 18 for separating the lower end portion of the guide element $14_5$ from an adjacent base portion 21 of the body 18. The body 18 is further formed with a horizontal slot 22 which separates the base portion 21 from the remaining or major portion of the body 18 constituting the base block $15_5$. The base block or major portion $15_5$ of the one-piece body 18 is shown to be connected to the base portion 21 thereof only by a relatively narrow neck 23 (FIG. 12) at the forward end of the slot 22 and which is capable of flexing so as to permit tilting of the block $15_5$ and the guide element $14_5$ relative to the base portion 21. In order to adjust or control such tilting of the guide element $14_5$, an elongated bolt 24 extends downwardly through a bore 25 formed vertically in a back portion of the base block $15_5$ and into the underlying base portion 21. The portion of the bore 25 in the base portion 21 of the body 18 is threaded and is threadably engaged by the lower end portion of the bolt 26 (FIG. 12), while the head of the bolt 24 engages a seat 26 (FIG. 11) formed about the bore 25 on an upper surface of the body 18. It will be appreciated that, by turning the bolt 24 so as to engage the latter more or less deeply in the threaded portion of the bore 25 in the base portion 21, the width l of the slot 22 is changed at the back of the body 18 so as to tilt or incline the guide element $14_5$.

Figures 13, 14:
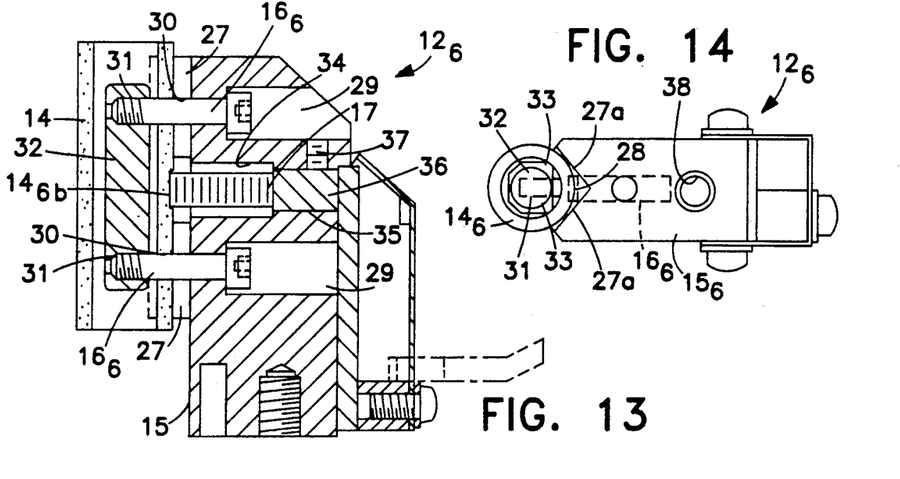
FIG. 13 is an enlarged vertical sectional view of a preferred structural embodiment of the invention which is similar to that schematically illustrated on FIG. 9.
FIG. 14 is bottom plan view of the tape guiding device shown on FIG. 13.

Referring now to FIGS. 13 and 14, it will be seen that a tape guiding device $12_6$ according to a practical embodiment of the invention is there shown to be similar to that schematically illustrated in FIG. 9 in that it employs a tubular guide element $14_6$ which may be desirably formed of a ceramic material. In the tape guiding device $12_6$, the front face $15_6$ of the base block $15_6$ has spaced apart upper and lower seat portions 27 engageable with the outer surface of the tubular guide element $14_6$ at the locations where the guide element $14_6$ is to be fixedly connected to the base block $15_6$. As shown particularly on FIG. 14, each of the seat portions 27 has converging side surfaces 27a tangentially engageable with the outer cylindrical surface of the tubular guide element $14_6$ and enclosing an angle 28 which is substantially bisected by the direction in which fastening screws $16_6$ are effective to urge the tubular guide element $14_6$ toward the base block $15_6$. More specifically, the fastening screws $16_6$ are shown to extend forwardly through bores 29 located i the base block $15_6$ so as to be centered in respect to the seat portions 27. The forward threaded end portions of the fastening screws $16_6$ extend through correspondingly located holes 30 in the wall of the tubular guide element $14_6$ and are screwed into tapped bores 31 formed in a back-up member 32 positioned within the tubular guide element $14_6$. The back-up member 32 is dimensioned to be loosely received within the interior of the tubular guide element $14_6$ and is formed with limited bearing surfaces 33 (FIG. 14) engageable with the inside surface of the tubular guide element $14_6$ substantially only at the regions of the latter where the outer surface of the guide element $14_6$ is tangentially engageable with the converging side surfaces 27a of the seat portions 27. It will be appreciated that, when the fastening screws $16_6$ are tightened so as to draw the back-up member 32 in the direction toward the front face $15_{6a}$ of the base block $15_6$, the limited bearing surfaces 33 of the back-up member press the tubular guide element $14_6$ against the side surfaces 27a of the seat portions 27 and thereby fixedly connect the guide element $14_6$ with the base block $15_6$ at spaced apart locations along the guide element $14_6$ which correspond with nodes of the standing wave oscillation generated in the tubular guide element $14_6$ when the ultrasonic transducer 17 is energized. Since the outer and inner surfaces of the tubular guide element $14_6$ are substantially unsupported except at the limited bearing surfaces 33 of the back-up member 32, the standing wave oscillation generated in the tubular guide element $14_6$ can have both longitudinal and circumferencial nodes.

As further shown in FIG. 13, in the tape guiding device $12_6$, the body $15_6$ is formed with a cavity 34 centered between the bores 29 and opening at the front face $15_{6a}$ for accommodating the ultrasonic transducer 17 which, at one end bears against a shallow recess $14_{6b}$ formed in the outer surface of the tubular guide element $14_6$ midway between the holes 30. In order to facilitate the insertion of the ultrasonic transducer 17 into the cavity 34, the base block $15_6$ is further desirably formed with a passage 35 opening from the back face of the base block into the cavity 34 for the passage of the transducer 17 therethrough. After installation of the transducer 17 in the cavity 34, the passage 35 is closed by a bearing block 36 which is secured in position by a set screw 37 and which is engaged by the end of the ultrasonic transducer 17 remote from the tubular guide element $14_6$. Finally, the bottom face of the base block $15_6$ may have a tapped bore 38 opening therethrough for receiving a securing bolt (not shown) by which the tape guiding device $12_6$ may be secured to its respective slider 13A or 13B on FIG. 4.

In all of the previously described embodiments of the invention, the ultrasonic oscillation generating transducer 17 acts on the elongated guide element 14 in a direction perpendicular to the longitudinal axis of the guide element at a position midway between the locations where the guide element 14 is fixedly connected, as by the support rods 16, to the base block 15 for generating a standing wave oscillation in the guide element 14. However, the present invention is not limited to such placement of the ultrasonic oscillation generating transducer 17 relative to the guide element 14. Thus, for example, as shown on FIGS. 15 and 16, a tape guiding device $12_7$ which is otherwise similar to the tape guiding device 12A or 12B of FIGS. 5 and 6 has its ultrasonic oscillation generating transducer $17_7$ extending between the respective elongated guide element $14_7$ and the front face 15a of the base block 15 at a location adjacent one of the ends of the guide element $14_7$ which project beyond the support rods 16 by which the guide element $14_7$ is fixedly connected to the base block 15. The guide element $14_7$ is shown to differ from the guide element 14 of FIGS. 5 and 6 only in that the shallow recess 14b located midway between the bores 14a in the guide element 14 is replaced by a similar shallow recess $14_{7b}$ located adjacent one of the ends of the guide element $14_7$ for receiving one end of the ultrasonic oscillation generating transducer $17_7$ which has its other end placed against the front face 15a of the base block 15.

When the transducer $17_7$ is suitably energized, the adjacent end portion of the guide element $14_7$ is directly oscillated in the direction perpendicular to the longitudinal axis of such guide element, and a standing wave oscillation, again indicated in dot-dash lines W on FIG. 16, is thereby generated in the guide element $14_7$ with nodes of such standing wave oscillation appearing at the locations where the guide element $14_7$ is fixedly connected to the base block 15, as by the support rods 16.

By reason of the fact that the guide element $14_7$ is mounted so as to ensure that the action of the ultrasonic transducer $17_7$ thereon will generate a standing wave oscillation at the resonance frequency of the element $14_7$, both the guide element $14_7$ and the tape T engaging its peripheral surface can be readily oscillated in the radial direction of the guide element at a very substantially higher frequency than is attainable with the prior art, with the result that the frictional resistance to movement of the magnetic tape T relative to the guide element $14_7$ is reduced to an extremely small value and stable tape movement can be achieved.

Figure 17:
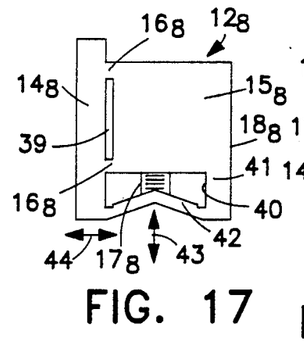
FIG. 17 is a schematic side elevational view showing another embodiment of the invention in which oscillations are imparted to the tape guide element at an end of the latter.

Referring now to FIG. 17, it will be seen that a tape guiding device $12_8$ according to still another embodiment of the invention includes an elongated guide element $14_8$ and base block $15_8$ formed as integral portions of a one-piece body $18_8$. More specifically, the one-piece body $18_8$ is shown to be formed with a slot 39 extending laterally therethrough between the central portion of the guide element $14_8$ and the base block $15_8$ for defining, at its ends, integral necks $16_8$ by which the guide element $14_8$ is fixedly connected with the base block $15_8$ at locations corresponding to nodes of a standing wave oscillation that can be generated in the guide element $14_8$. The one-piece body $18_8$ further has a cavity 40 at its lower portion for centrally accommodating the ultrasonic oscillation generating transducer $17_8$ which is formed of a stack of piezo-electric plates with the axis of such stack extending parallel to the longitudinal axis of the elongated guide element $14_8$. The lower margin of the cavity 40, which extends between the lower end of the guide element $14_8$ and an integral abutment 41 at the remote side of the body $18_8$, defines an angled extension 42 integral with the lower end of the guide element $14_8$ and also with the abutment 41. It will be appreciated that, upon operation of the ultrasonic oscillation generating transducer $17_8$, oscillations in the direction of the arrows 43 are imparted to the angled extension 42 which, as a result thereof, transmits oscillations to the lower end of the guide element $14_8$ in the direction of the arrows 44. Thus, in effect, the transducer $17_8$ acts on the lower end of the guide element $14_8$ in the direction perpendicular to the longitudinal axis of the guide element for again generating a standing Wave oscillation in the guide element $14_8$ having nodes at the necks or fixed connections $16_8$ between the guide element and the base block $15_8$.

Figure 15:
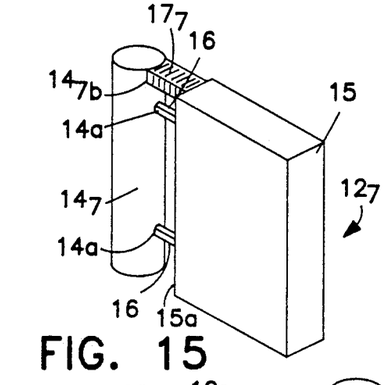

In all of the previously described embodiments of the invention, the ultrasonic oscillations generated by the transducer 17, $17_7$ or $17_8$ have been imparted to the respective guide element in a direction at right angles to the longitudinal axis of the guide element either at an end of the latter, as in FIGS. 15-17, or at a location intermediate the nodes of the standing wave oscillation corresponding to the locations where the guide element is fixedly connected to the respective base block. However, the present invention is not limited to such arrangement of the ultrasonic oscillation generating transducer relative to the respective guide element. More specifically, the present invention can also be embodied in tape guiding devices in which oscillations generated by an ultrasonic transducer directly act on an elongated guide element in a direction parallel to the longitudinal axis of the latter in such a way as to produce a standing wave oscillation in the guide element for reducing the coefficient of friction of a magnetic tape in respect to the surface of the guide element slidably engaged by the tape.

Figure 18:
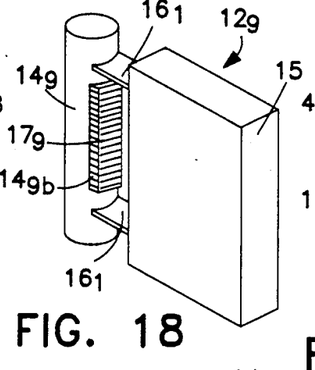
FIGS. 18 and 19 are schematic perspective views showing additional respective embodiments of the invention in which an ultrasonic oscillation generating transducer acts directly on the guide element parallel to the longitudinal axis of the latter.

Thus, for example, as shown on FIG. 18, in a tape guiding device $12_9$ embodying the present invention, and which is otherwise generally similar to the previously described tape guiding device $12_1$ of FIG. 7, a solid cylindrical guide element $14_9$ is fixedly connected to the respective base block 15 by relatively flat or web-like support members $16_1$ located at nodes of a standing wave oscillation to be generated in the guide element, and the guide element $14_9$ has a recess $14_{9b}$ extending parallel to the longitudinal axis of the guide element $14_9$ at the side of the latter facing the guide block 15 between the support members $16_1$. Accommodated within the recess $14_{9b}$ is an ultrasonic oscillation generating transducer $17_9$ which is again constituted by a stack of piezo-electric plates arranged so that the plates at the opposite ends of the stack act against respective ends of the recess $14_{9b}$. It will be appreciated that, upon energizing of the transducer $17_9$, the stack of piezo-electric plates expands and contracts in the direction of the longitudinal axis of the guide element $14_9$ and acts against the ends of the recess $14_{9b}$ for directly generating the desired standing wave oscillation in the guide element with the nodes of the standing wave oscillation being situated at the locations of the support members $16_1$.

Since the ultrasonic oscillation generating transducer $17_9$ is contained, at least in part, within the elongated recess $14_{9b}$ of the guide element $14_9$, the forces generated by operation of the transducer $17_9$ are directly transmitted to the guide element $14_9$ substantially without any loss or leakage of the oscillating energy so that the efficiency of the device $12_9$ is thereby enhanced. Further, since the transducer $17_9$ is accommodated for the most part within the recess $14_{9b}$ of the guide element $14_9$, and directly effects the oscillation of the latter, the distance between the guide element $14_9$ and the respective base block 15 can be minimized and the size of the base block can be reduced for minimizing the weight of the tape guiding device $12_9$ and enhancing its miniaturization.

Figure 19:
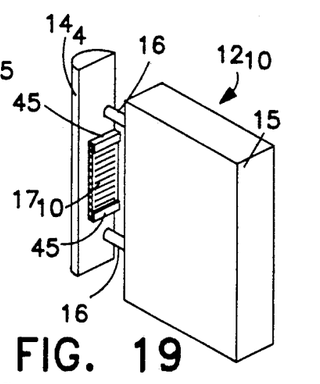

FIG. 19 shows a tape guiding device $12_{10}$ according to still another embodiment of this invention in which, as in the embodiment of FIG. 18, oscillations are applied directly from an ultrasonic oscillation generating transducer $17_{10}$ to a guide element $14_4$ in the direction of the longitudinal axis of the latter. More specifically, in the tape guiding device $12_{10}$, the guide element $14_4$ is generally similar to that in the embodiment previously described with reference to FIG. 10, in that it has a half-cylindrical configuration and is fixedly connected to the base block 15 by support rods 16 located at nodes of the standing wave oscillation to be generated in the guide element $14_4$. The ultrasonic oscillation generating transducer $17_{10}$ comprised of a stack of piezo-electric plates is mounted directly on the mid-portion of the flat or chordal surface of the half-cylindrical guide element $14_4$ between a spaced apart pair of L-shaped abutments or stops 45 suitably secured to, or molded integrally with the guide element. The tape guiding device $12_{10}$ functions generally in the same manner as the previously described device $12_9$ and has the added advantage of further reducing the weight of the guide element $14_4$ for facilitating its oscillation at a high frequency.

Figure 22:
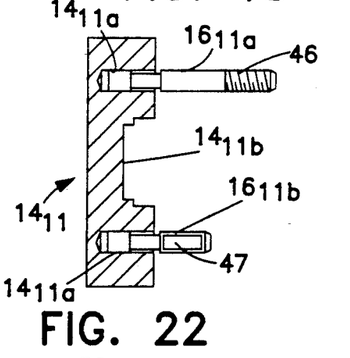
FIG. 22 is a detail view, partly broken away and in vertical section, of the guide element included in the device of FIG. 20.
Figure 23:
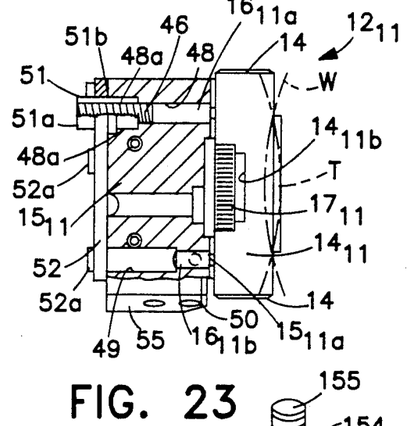
FIG. 23 is a vertical sectional view of the tape guiding device of FIG. 20, but as viewed from the side opposite that shown in FIG. 20.

Referring now to FIGS. 20–23, it will be seen that a tape guiding device $12_{11}$ according to another practical embodiment of the invention is there shown to be similar to that schematically illustrated in FIG. 18 in that it employs a cylindrical guide element $14_{11}$ formed with a longitudinally extending recess $14_{11b}$ (FIG. 22) opening laterally at the side of the guide element facing toward the base block $15_{11}$ for accommodating the ultrasonic oscillation generating transducer $17_{11}$ therein (FIG. 23). The recess $14_{11b}$ is desirably centered between diametrically extending bores $14_{11a}$ in which there are respectively press-fitted relatively long and short support rods $16_{11a}$ and $16_{11b}$ (FIG. 22). The end portion of the long support rod $16_{11a}$ remote from the guide element $14_{11}$ is threaded, as at 46, and the end portion of the relatively short rod $16_{11b}$ extended from the guide element has a flat surface 47 at the side thereof.

Figure 20:
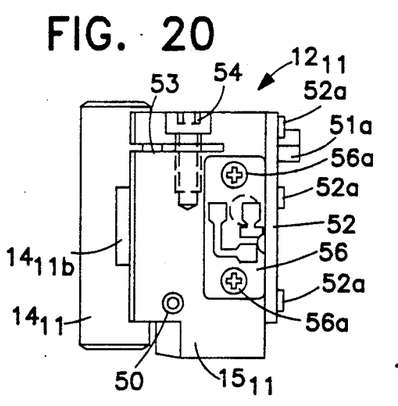
FIG. 20 is a side elevational view of another preferred structural embodiment of the present invention which is generally similar to the type schematically illustrated in FIG. 18.
Figure 21:
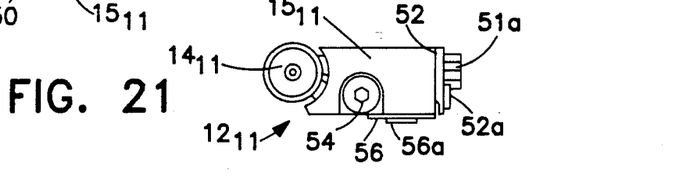
FIG. 21 is a bottom plan view of the tape guiding device shown on FIG. 20.

The base block $15_{11}$ is approximately in the shape of a rectangular parallelepiped and has upper and lower bores 48 and 49 extending therethrough from the front face $15_{11a}$ of the base block. The upper, relatively long support rod $16_{11a}$ extends loosely through the bore 48 which has a counter-bored back end portion, as at 48a (FIG. 23). The relatively short support rod $16_{11b}$ is press-fitted into the lower bore 49 and secured therein, as by a set screw 50 (FIG. 20). An adjusting nut 51 is threadably engaged on the threaded portion 46 of the relatively long support rod $16_{11a}$ and is received within the counter-bored end portion 48a of the bore 48. The adjusting nut 51 (FIG. 23) is rotatable within the counter-bored portion 48a of the bore 48 and has a flange 51b which is held against axial movement by a retaining plate 52 through which an hexagonal head 51a of the adjusting nut 51 rotatably projects.

The top portion of the base block $15_{11}$ is slotted at the opposite sides of the bore 48, as at 53 on FIG. 20, and a bolt 54 extends downwardly across the slot 53 (FIGS. 20 and 21) and can be tightened for locking the support rod $16_{11a}$ within the bore 48.

When the bolt 54 is loosened, the adjusting nut 51 on the threaded back end portion of the support rod $16_{11a}$ can be rotated by a wrench or other tool engaging its hexagonal head 51a, thereby to make small changes in the inclination of the guide element $14_{11}$ relative to the base block $15_{11}$ about a fulcrum constituted by a reduced diameter portion of the lower support rod $16_{11b}$ situated between the guide element $14_{11}$ and the base block $15_{11}$. After such adjustment of the inclination of the guide element $14_{11}$, the position of the latter relative to the base block $15_{11}$ is locked by tightening the bolt 54.

As shown on FIG. 23, the bottom surface 55 of the base block $15_{11}$ may be inclined so that, when such bottom surface is secured to a respective one of the sliders 13A and 13B on FIG. 4, the guide element $14_{11}$ mounted on the base block $15_{11}$ will be inclined at the required angle relative to the rotary head drum 11 at the completion of a tape loading operation.

As shown on FIG. 20, a terminal plate 56 may be conveniently secured, as by screws 56a, on a side surface of the base block $15_{11}$.

It will be appreciated that, in the case of the tape guiding device $12_{11}$, the ultrasonic oscillation generating transducer $17_{11}$ accommodated in the recess $14_{11b}$ of the guide element $14_{11}$ is mounted parallel to the longitudinal axis of the guide element $14_{11}$ at one side thereof and thus is operative to generate a standing wave oscillation W indicated by dot-dash lines on FIG. 23. Thus, the coefficient of friction of the tape T in respect to the surface of the guide element $14_{11}$ is efficiently reduced.

Referring now FIGS. 24–28, it will be seen that a tape guiding device 120 according to still another embodiment of the invention is mounted on a slider 13 constituting a base and being conventionally movable in a so-called "M-loading" operation, as shown on FIG. 4. As shown particularly on FIG. 24, the base or slider 13 has a recess 131 in its upper surface from which a suitably fixed supporting shaft 132 extends vertically and terminates in a threaded upper end portion 133.

Figure 24:
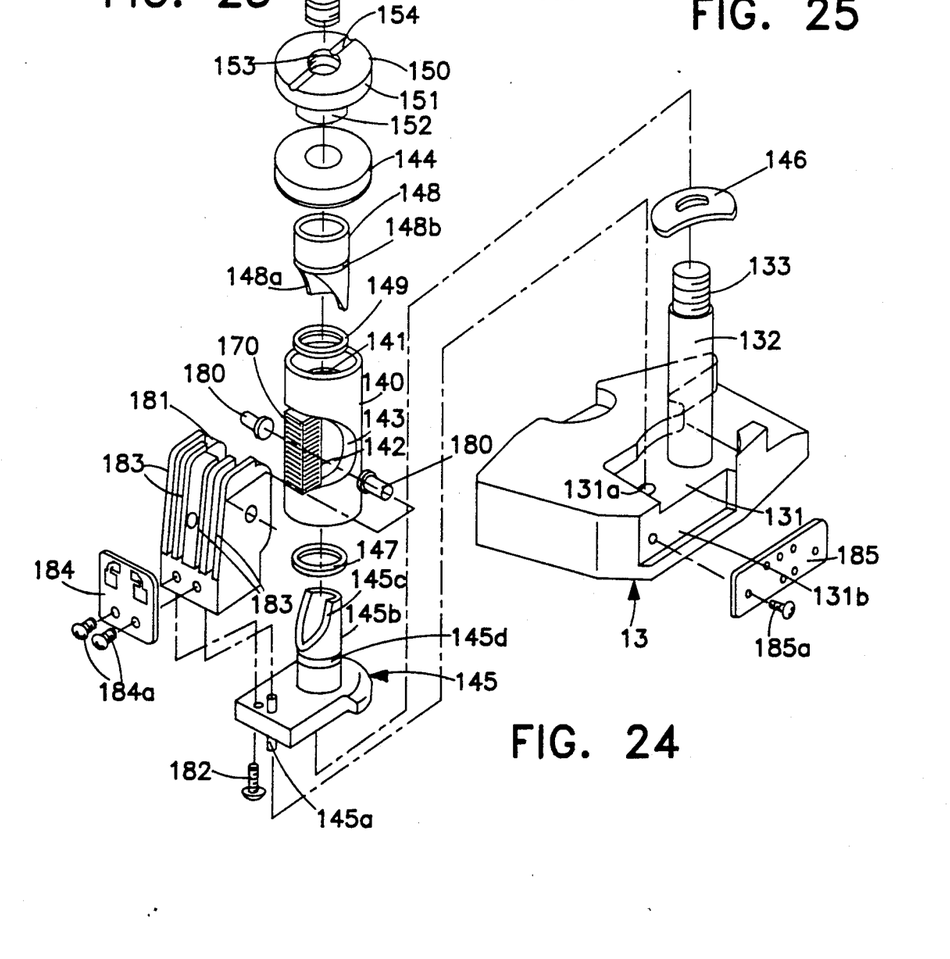
FIG. 24 is an exploded perspective view of the parts making up a tape guiding device according to another structural embodiment of the invention.
Figure 25:
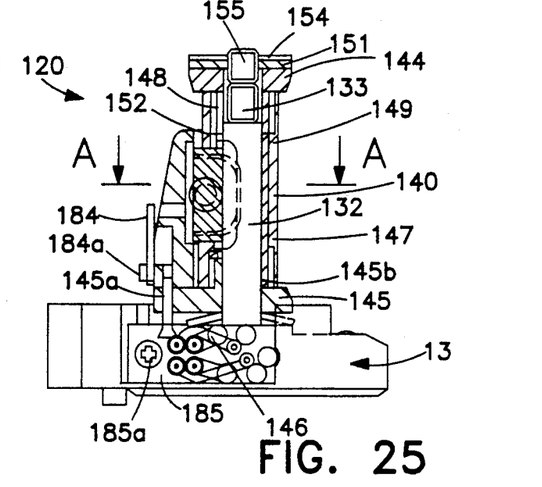
FIG. 25 is a vertical sectional view of the assembled tape guiding device of FIG. 24.
Figure 26:
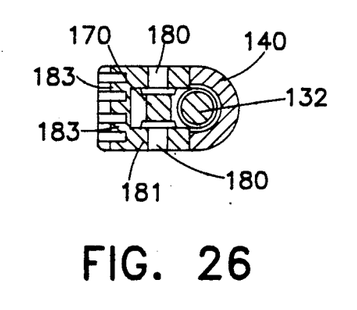
FIG. 26 is a sectional view taken along the line A—A on FIG. 25.
Figure 27:
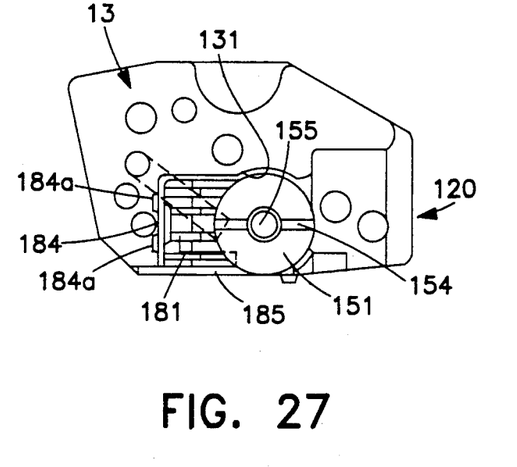
FIG. 27 is a top plan view of the assembled tape guiding device of FIG. 25.
Figure 28:
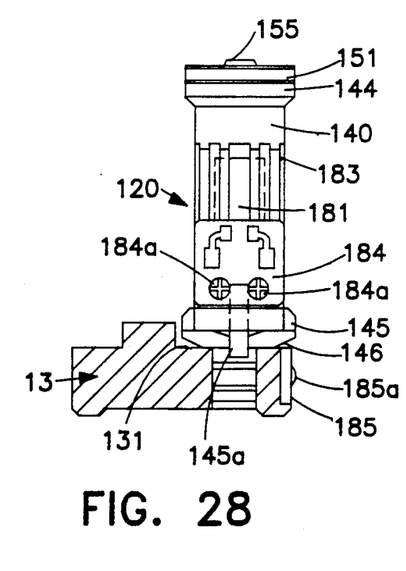
FIG. 28 is a front elevational view of the tape guiding device of FIGS. 25 and 27, with a base portion thereof shown in section.

A tubular tape guide element 140 of metal or ceramic is diametrically dimensioned to extend loosely about the support shaft 132 and is formed, at its inner surface, with upper and lower annular shoulders 141 and 142, respectively, facing axially towards the respective open ends of the tubular guide element 140. Further, intermediate its ends, the guide element 140 is formed with a cutout 143 opening at one side of the guide element 40 for accommodating an ultrasonic oscillation generating transducer 170. The transducer 170 is constituted by a stack of piezo-electric plates having its axis parallel to the longitudinal axis of the guide element 140 and being adhesively secured in the cutout 143 with the end plates of the stack bearing against the upper and lower edges of the cut-out 143.

For the purpose of guiding a magnetic tape in the direction of its width as the tape runs longitudinally about the peripheral surface of the guide element 140 at the side thereof remote from the cutout 143, the tape guiding device 120 includes upper and lower flange members 144 and 145, respectively. A resilient bent washer 146 is provided on the support shaft 132 below the lower flange member 145 which fits about the shaft 13 and is shaped to generally conform to the shape of the recess 131 in the base or slider 13. A pin 145a extends through the lower flange member 145 and, at its lower end, is received in an elongated slot 131a in the floor of the recess 131 for preventing rotation of the lower flange member 145 about the support shaft 132. A collar 145b extends upwardly from the lower flange member 145 about the support shaft 132, and has its upper end cut at an angle, as at 145c, so as to approximately correspond to the shape of the lower portion of the cutout 143 in the guide element 140. Further, the collar 145b is formed with an annular groove 145d of approximately U-shaped cross section extending around the outer surface of the collar below the cut upper end 145c, and such annular groove 145d accommodates a rubber O-ring 147.

When the tubular guide element 140 is installed downwardly on the support shaft 132 after the lower flange member 145, the collar 145b is received loosely in the lower end portion of the tubular guide element 140 and the O-ring 147 in the groove 145d abuts against the downwardly facing shoulder 142.

After the tubular guide element 140 is installed on the shaft 132, a tubular spacing collar 148 is installed downwardly on the shaft 132 and enters the upper end portion of the tubular guide element 140. The lower end portion of the collar 148 is cut at an angle, as at 148a, and an annular groove 148b of U-shaped cross section is formed in the outer surface of the collar 148 above the cut lower end 148a and receives a rubber O-ring 149. When the collar 148 is inserted in the upper end portion of the tubular guide element 140, the O-ring 149 in groove 148b engages the upwardly facing annular shoulder 141 within the guide element. At such time, the lower end edge of the collar 148 engages the upper end edge of the collar 145b on the lower flange member 145 so as to precisely determine the axial distance between the O-rings 147 and 149 and to position such O-rings at nodes of the stationary wave oscillation which is to be generated in the tubular guide element 140 by operation of the ultrasonic transducer 170.

The upper flange member 144 is in the form of a ring and is adapted to seat on the upper edges of the tubular guide element 140 and of the spacing collar 148. An adjusting member 150 includes a disk 151 from which there depends a hollow central boss 152 which is internally threaded, as at 153. The threaded boss 152 is dimensioned to extend downwardly through the upper flange member 144 and into the spacing collar 148 for threadable engagement with the threaded upper end portion 133 of the support shaft 132. The upper surface of the disk 151 is formed with a diametrically extending slot 154 engagable by a coin or tool for turning the adjusting member 150 and thereby changing the axial or vertical position of the upper flange member 144 relative to the support shaft 132. By reason of the bearing engagement of the upper flange member 144 on the upper edge of the spacing collar 148 and on the upper edge of the tubular guide element 140, the vertical or axial positions of the tubular guide element 140 and of the lower flange member 145 are also correspondingly adjusted relative to the support shaft 132 against the resistance of the bent washer 146 interposed between the lower flange member 145 and the floor of the recess 131. After the vertical or axial positions of the tubular guide element 140 and the associated flange members 144 and 145 have been adjusted, a set screw 155 is threadably engaged in the internally threaded hollow boss 152 so as to axially bear against the upper end of the shaft 132 and thereby lock the adjustment.

For the purpose of preventing turning of the tubular guide element 140 and the ultrasonic transducer 170 about the shaft 132, the sides of the ultrasonic transducer 170 are located between metal pins 180 which are carried by a metal holder 181 fixed to the lower flange member 145 by means of a screw 182 and the pin 145a. At its side facing away from the tubular guide element 140, the holder 181 is formed with a plurality of radiating fins 183 for dissipating heat from the ultrasonic transducer 170. In order to enhance the radiating effect, silicon resin may be injected between the holder 181 and the ultrasonic oscillation generating transducer 170. As shown particularly on FIGS. 24 and 27, a terminal plate 184 may be secured to a lower portion of the holder 181, as by screws 184a. Finally, as shown on FIGS. 24 and 25, a connector base plate 185 may be secured by a screw 185a in an undercut region 131b at one side of the recess 131 in the base or slider 13.

It will be appreciated that, in operation of the above described tape guiding device 120 according to the present invention, oscillations are applied directly from the ultrasonic transducer 170 to the central portion of the guide element 140 in the longitudinal direction of the latter so that a stationary or standing wave oscillation is generated in the tape guide element 140 with nodes thereof appearing at the locations of the O-rings 147 and 149 by which the guide element 140 is fixed to the support shaft 132 and the base or slider 13. By reason of the foregoing, the tubular guide element 140 and the magnetic tape guided by its peripheral surface can be easily made resonant together in the radial direction of the guide element 140. Furthermore, the resonant frequency of the guide element 140 can have a value very substantially greater than that achieved with the prior art so that the cohesion of the magnetic tape to the outer peripheral surface of the guide element 140 can be reduced to an insignificant amount for ensuring stabilized running of the tape. Once again, since the ultrasonic transducer 170 directly applies the oscillations to the guide element 140, there is substantially total transmission of the oscillation energy and the efficiency of operation is enhanced. Furthermore, when the resonance frequency is increased, as indicated above, the heat generated from the ultrasonic transducer 170 is readily withdrawn therefrom and discharged to the atmosphere by the radiating fins 183 on the holder 181 with the result that the guided magnetic tape is not deformed or otherwise damaged by excessive heating of the guide element 140. Finally, since the height of the magnetic tape guided by the guide element 140 between the flange members 144 and 145 can be easily adjusted against the force of the spring washer 146 by turning the adjusting member 150, the precise height of the guided tape on the rotary head drum 11 can be readily determined. Finally, if the tubular guide element 140 of the tape guiding device 120 is formed of a ceramic material, the previously-mentioned advantages of the invention are increasingly achieved. In other words, since the guide element 140, when formed of a ceramic material, has a lower specific gravity than when formed of a metal and its strength or Young's modulus is high, the resonance frequency of the guide element 140 is thereby further increased. Such increased resonance frequency further decreases the coefficient of friction of the magnetic tape in respect to the guide element 140 and also reduces the distance along the tape that the oscillations are transmitted from the site of the guide device 120. Moreover, a ceramic guide element 140 has excellent resistance to wear and is relatively cheaply produced.

Although numerous embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A tape guiding device for guiding a tape while the latter is longitudinally transported, said device comprising:
   a guide element having a peripheral surface slidably engageable by the tape for guiding the latter;
   base means;
   connecting means extending from said base means and fixedly connected with said guide element at locations which are spaced from each other on the guide element for supporting the latter on said base means; and
   ultrasonic oscillation generating means in direct contact with and acting, at least at one end, against said guide element for generating a standing wave oscillation in said guide element which has nodes at said spaced from each other locations where said guide element is fixed to said connecting means.

2. A tape guiding device according to claim 1; in which said guide element is elongated in a direction transverse to the longitudinal direction of the transported tape, and said locations where the guide element is fixed to said connecting means are spaced apart in said direction in which the guide element is elongated.

3. A tape guiding device according to claim 2; in which said ultrasonic oscillation generating means acts on said guide element in a direction perpendicular to said direction in which the guide element is elongated.

4. A tape guiding device according to claim 3; in which said ultrasonic oscillation generating means is interposed between said base means and said guide element.

5. A tape guiding device according to claim 4; in which said one end of the ultrasonic oscillation generating means engages said guide element intermediate said locations on said guide element where the guide element is fixed to said connecting means.

6. A tape guiding device according to claim 4; in which ends of said guide element project beyond said locations where the guide element is fixed to said connecting means, and said one end of the ultrasonic oscillation generating means engages said guide element adjacent one of said ends of the latter.

7. A tape guiding device according to claim 3; in which ends of said guide element project beyond said locations where the guide element is fixed to said connecting means, one of said ends of the guide element has an angled integral extension, and said ultrasonic oscillation generating means is interposed between said base means and said angled integral extension of the guide element for, in effect, acting on said one end of the guide element in said direction perpendicular to the direction in which the guide element is elongated.

8. A tape guiding device according to claim 1; in which said guide element and connecting means are integral with said base means.

9. A tape guiding device according to claim 1; in which said guide element is solid.

10. A tape guiding device according to claim 1; in which said guide element is tubular.

11. A tape guiding device according to claim 1; in which said peripheral surface is cylindrical.

12. A tape guiding device according to claim 1; in which said peripheral surface is half-cylindrical.

13. A tape guiding device according to claim 1; in which said guide element includes a ceramic outer member defining said peripheral surface engageable by the tape.

14. A tape guiding device according to claim 1; in which said guide element is elongated in a direction transverse to the longitudinal direction of the transported tape and has a recess extending parallel to said direction in which the guide element is elongated, said recess opens at a side of said guide element facing away from said peripheral surface engaged by the tape, and said ultrasonic oscillation generating means is accommodated in said recess and acts, at its opposite ends, against respective ends of said recess for directly generating said standing wave oscillation in said guide element.

15. A tape guiding device according to claim 14; in which said guide element is tubular.

16. A tape guiding device according to claim 15; in which said base means includes a support block having an upstanding shaft extending therefrom and passing loosely through said tubular guide element, and said connecting means includes means on said shaft carrying O-rings that engage the interior of said tubular guide element at said spaced apart locations corresponding to said nodes of the standing wave oscillation.

17. A tape guiding device according to claim 16; in which upper and lower flange members are movable along said upstanding shaft at opposite ends of said tubular guide element for positioning the tape in said direction transverse to the longitudinal direction of the transported tape, and means are provided for adjusting said tubular guide element and said flange members axially along said shaft.

18. A tape guiding device according to claim 15; in which said base means includes finned heat dissipating means proximate to said ultrasonic oscillation generating means in said recess of the tubular guide element for withdrawing heat therefrom.

19. A tape guiding device according to claim 14; in which said connecting means includes substantially parallel, spaced apart, relatively long and short mounting rods extending from said elongated guide element substantially at right angle to the longitudinal axis of said guide element at said locations where the latter is fixedly connected with said connecting means; and said base means includes a base block having a blind bore in which said relatively short mounting rod is secured and a through bore through which said relatively long mounting rod loosely extends, said relatively long mounting rod having a threaded end portion extending from said through bore, and an adjusting nut movable along said threaded end portion and engageable with said base block for angularly adjusting said guide element relative to said base block.

20. A tape guiding device according to claim 1; in which said guide element is elongated in a direction transverse to the longitudinal direction of the transported tape, and said locations where the guide element is fixedly connected to said connecting means are spaced apart in said direction in which the guide element is elongated; and in which said base means includes a support block having a slot which divides said block into a major portion from which extend said connecting means fixedly connected to said guide element at said locations and a base portion with a relatively narrow connecting neck between said major portion and base portion capable of flexing for tilting said major portion of the support block and said guide element relative to said base portion, and means for adjusting said tilting of the guide element.

21. A tape guiding device according to claim 20; in which said guide element, connecting means and support block are integral with each other.

22. A tape guiding device according to claim 1; in which said guide element is tubular and elongated in a direction transverse to the longitudinal direction of the transported tape, said locations where the guide element is fixed to said connecting means are spaced apart in said direction in which the guide element is elongated, and said ultrasonic oscillation generating means is interposed between said base means and said guide element and acts on the latter in a direction perpendicular to said direction in which the guide element is elongated at a position on said guide element between said locations where the latter is fixedly connected with said connecting means.

23. A tape guiding device according to claim 1; in which said ultrasonic oscillation generating means includes a stack of ultrasonic piezo-electric transducer plates.

24. A tape guiding device for guiding a tape while the latter is longitudinally transported, said device comprising:

a tubular guide element having a peripheral surface slidably engageable by the tape for guiding the latter and being elongated in a direction transverse to the longitudinal direction of the transported tape;

a base block;

connecting means extending from said base block and fixedly connected with said tubular guide element at locations which are spaced from each other on the guide element in said direction in which the guide element is elongated for supporting said guide element on said base block, said connecting means including spaced apart seat portions on said base block which are engageable with the outside of said tubular guide element at said spaced from each other locations where the guide element is fixed to said connecting means, a back-up member within said tubular guide element and engageable with an inside surface of the latter, and fastening means extending from said base block through said tubular guide element and into said back-up member at said locations where the guide element is fixed to said connecting means for urging said back-up member toward said base block and thereby clamping said tubular guide element against said seat portions of the base block; and ultrasonic oscillation generating means interposed between said base block and said guide element and in direct contact with, and acting at one end on said guide element in a direction perpendicular to said direction in which the guide element is elongated at a position on said guide element between said locations where the latter is fixedly connected with said connecting means for generating a standing wave oscillation in said guide element which has nodes at said spaced from each other locations where said guide element is fixed to said connecting means.

25. A tape guiding device according to claim 24; in which each of said seat portions has converging side surfaces tangentially engageable with said outside of the tubular guide element and enclosing an angle substantially bisected by the direction in which said fastening means urge the back-up member toward said base block, and said back-up member has limited bearing surfaces engageable with said inside surface of the tubular guide element substantially at the regions of the latter where said outside is tangentially engageable with said converting side surfaces.

26. A tape guiding device according to claim 25; in which said angle enclosed by the converging side surfaces of the seat portions is approximately 90 degrees.

27. A tape guiding device according to claim 25; in which said direction in which said ultrasonic oscillation generating means acts on said tubular guide element also substantially bisects said angle enclosed by said converging side surfaces, and said outside and said inside surface of the tubular guide element are substantially unsupported except at said limited bearing surfaces so that said standing wave oscillation generated in said tubular guide element has longitudinal and circumferential modes.

* * * * *